US006276031B1

(12) United States Patent
Haiduk

(10) Patent No.: US 6,276,031 B1
(45) Date of Patent: Aug. 21, 2001

(54) BUNGEE CORD WITH HOOKLESS ENDS

(75) Inventor: Thomas J. Haiduk, Conover, WI (US)

(73) Assignee: Tommy Strap, LLC, Conover, WI (US)

( * ) Notice: Subject to any disclaimer, the term of this patent is extended or adjusted under 35 U.S.C. 154(b) by 0 days.

(21) Appl. No.: 09/460,183

(22) Filed: Dec. 11, 1999

(51) Int. Cl.$^7$ .............................. B65D 63/00; F16G 11/14
(52) U.S. Cl. ........................ 24/298; 24/16 PB; 24/17 B; 24/300; 24/302
(58) Field of Search ............................ 24/298, 299, 300, 24/301, 302, 17 B, 17 AP, 17 A, 17 R

(56) References Cited

U.S. PATENT DOCUMENTS

| 1,829,613 | * | 10/1931 | Sato | 24/17 AP |
| 1,945,932 | * | 2/1934 | Caley | 24/17 AP |
| 2,355,705 | * | 8/1944 | Cohn | 24/298 |
| 2,359,148 | * | 9/1944 | Partridge | 24/17 AP |
| 2,361,506 | | 10/1944 | Smith | 128/156 |
| 2,936,980 | * | 5/1960 | Rapata | 24/17 AP |
| 3,953,911 | * | 5/1976 | Fishack | 24/16 R |
| 3,979,094 | * | 9/1976 | DeWitt | 24/302 |
| 4,885,824 | * | 12/1989 | Schwab et al. | 24/17 B |
| 5,364,141 | * | 11/1994 | King | 292/318 |
| 5,797,167 | * | 8/1998 | Schwab | 24/300 |
| 5,896,623 | * | 4/1999 | Martin | 24/16 PB |
| 6,014,794 | * | 1/2000 | McCoy | 24/300 |
| 6,036,626 | * | 3/2000 | Taylor | 482/121 |

* cited by examiner

Primary Examiner—Victor N. Sakran
(74) Attorney, Agent, or Firm—Donald J. Ersler

(57) ABSTRACT

A bungee cord with hookless ends includes an elastic body, a first attachment end, and a second attachment end. In a first preferred embodiment, the first and second attachment ends are spade attachment ends. Each spade attachment end includes a lock body, spade end and a lock slot. The spade end must be twisted to be inserted into the lock slot. The spade end is then twisted back to its original orientation to lock thereof in the lock slot. In a second embodiment, the first attachment end is a spade attachment end and the second attachment end is a tongue attachment end. The tongue attachment end includes a tongue body, a tongue hole, and a tongue extension. To lock the tongue attachment end, the tongue extension is inserted through a hole in an item until the spade contoured portion prevents further insertion. The tongue extension is then inserted through the tongue hole. In a third preferred embodiment, the first attachment end is a tongue attachment end and the second end is a strap attachment end. The strap attachment end includes a strap body with at least two slots for retention of a strap. In a fourth preferred embodiment, the first attachment end is a tongue attachment end and the second end is a spade attachment end.

11 Claims, 3 Drawing Sheets

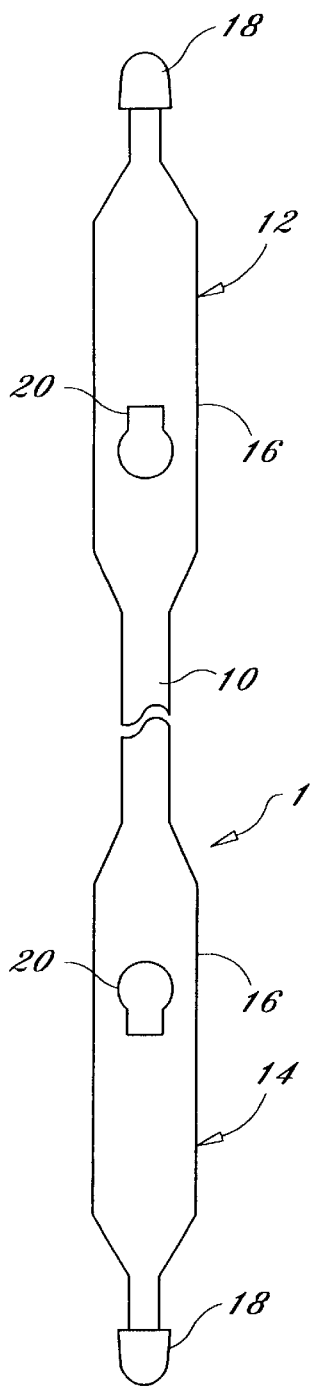
FIG. 1
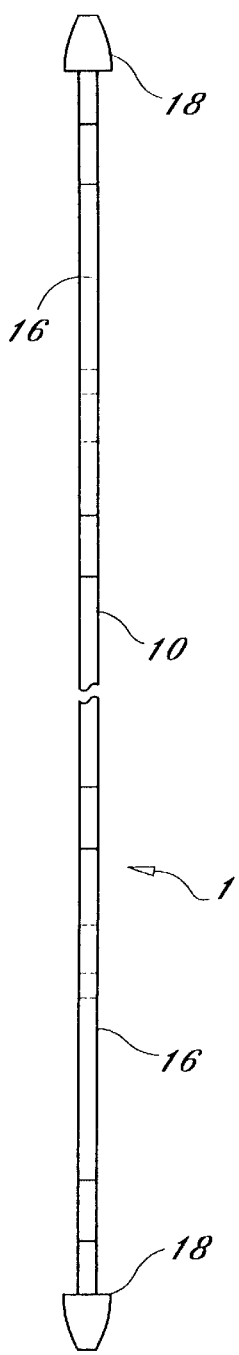
FIG. 2
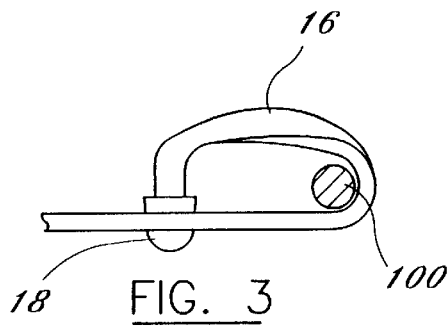
FIG. 3
FIG. 3a
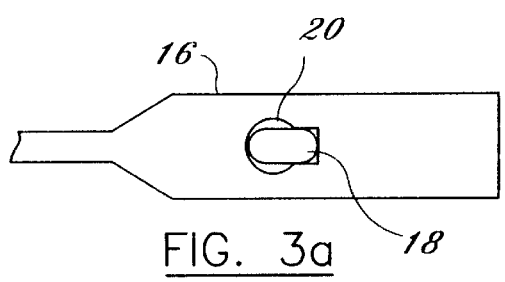
FIG. 4
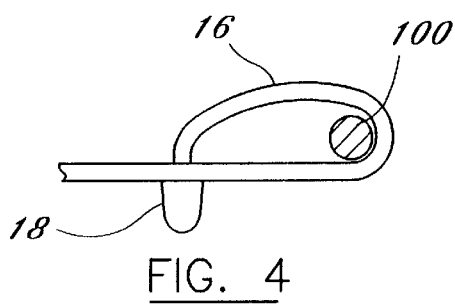
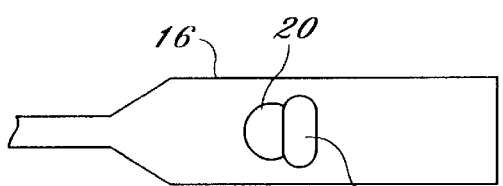
FIG. 4a

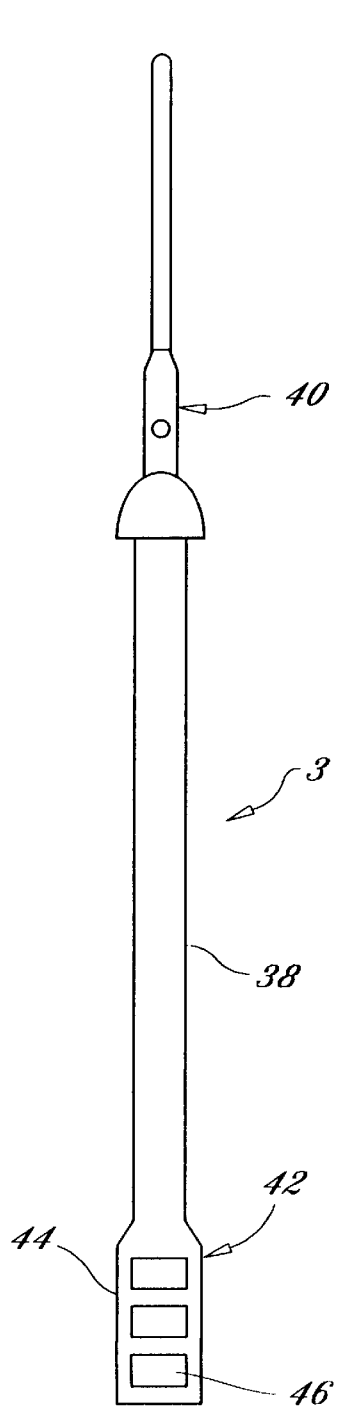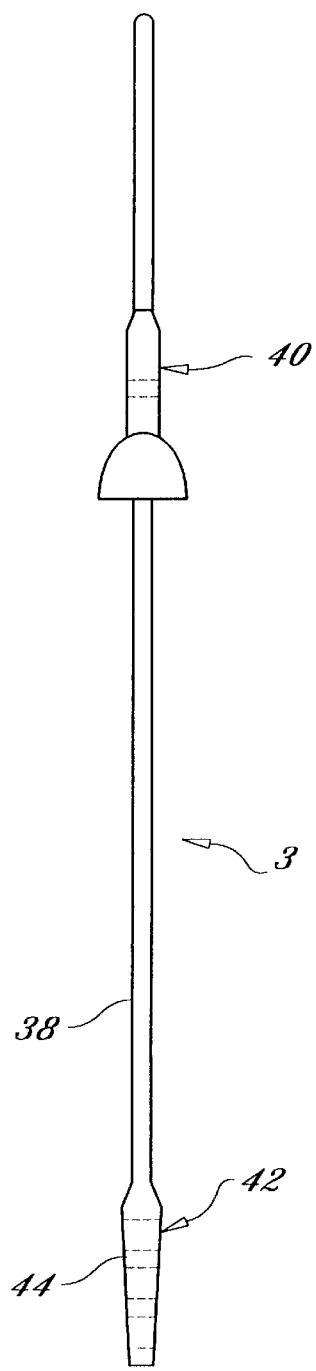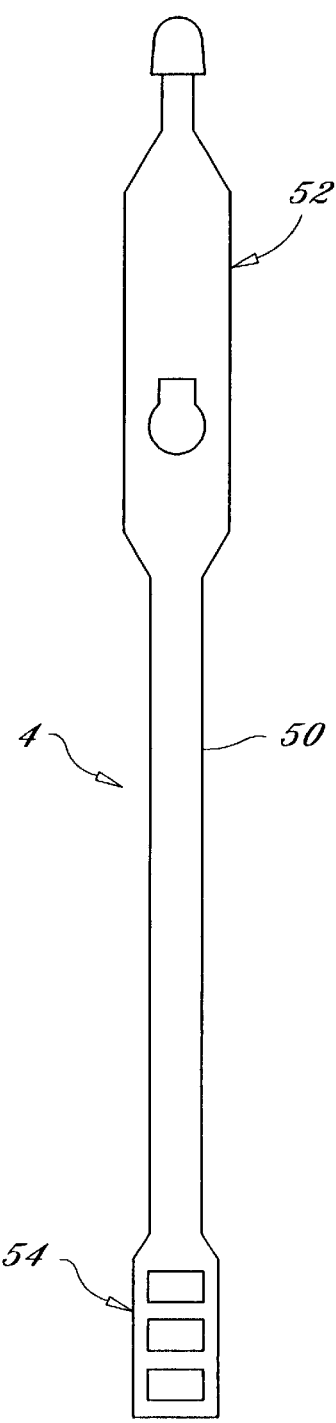

BUNGEE CORD WITH HOOKLESS ENDS

BACKGROUND OF THE INVENTION

1. Field of the Invention

The present invention relates generally to bungee cords and more specifically to a bungee cord with hookless ends that reduces the possibility of injury to a user.

2. Discussion of the Prior Art

A problem frequently encountered with bungee cords is the occurrence of eye injuries while attaching the bungee cord. The danger arises when people align their eye along the tension line of the bungee cord, hook one end of the bungee and then pull the cord to tighten it, only to have the hook come loose and hit them in the eye, according to the Bungee Cord Registry found at http://www.eyemd-va.org/bungee.htm. A recent survey of the Virginia Society of Ophthalmology members showed that over 50% of the doctors polled had treated bungee cord injuries. The danger appears to be the ability of the rigid metal hook end to act like a bullet and push into or pierce the eye ball. Sometimes the injury will heal, other times the person will lose their eye sight, and yet other times the eye ball has to be removed all together.

Accordingly, there is a clearly felt need in the art for a bungee cord with hookless ends which greatly reduces the possibility of injury to a user.

SUMMARY OF THE INVENTION

The primary objective of the present invention is to provide a bungee cord with hookless ends which greatly reduces the possibility of injury to a user.

According to the present invention, a bungee cord with hookless ends includes an elastic body, a first attachment end, and a second attachment end. In a first preferred embodiment, the first and second attachment ends are spade attachment ends. Each spade attachment end includes a lock body, spade end and a lock slot. The lock slot is disposed in the lock body. The spade end must be twisted to be inserted into the lock slot. The spade end is then twisted back to its original position to lock thereof in the lock slot. Each lock body is preferably wider than the elastic body.

In a second embodiment, the first attachment end is a spade attachment end and the second attachment end is a tongue attachment end. The spade attachment end is the same as previously described. The tongue attachment end includes a tongue body, a tongue hole, and a tongue extension. The tongue body includes a spade contoured portion and a straight portion. The tongue hole is disposed in the straight portion of the tongue body. To lock the tongue attachment end, the tongue extension is inserted through a hole in an item until the spade contoured portion prevents further insertion. The tongue extension is then inserted through the tongue hole. Pressure exerted by the elastic body in extension forces the tongue extension against the item and prevents the tongue extension from withdrawing from the tongue hole.

In a third preferred embodiment, the first attachment end is a tongue attachment end and the second end is a strap attachment end. The tongue attachment end is the same as previously described. The strap attachment end includes a strap body with at least two slots for the retention of a strap.

In a fourth preferred embodiment, the first attachment end is a spade attachment end and the second end is a strap attachment end.

Accordingly, it is an object of the present invention to provide a bungee cord with hookless ends which reduces the possibility of injury to a user.

It is a further object of the present invention to provide a bungee cord with a strap attachment end which allows the use of a strap in conjunction with a bungee cord.

Finally, it is another object of the present invention to provide a bungee cord with a tongue attachment end which allows the attachment of a bungee cord through an item with a hole.

These and additional objects, advantages, features and benefits of the present invention will become apparent from the following specification.

BRIEF DESCRIPTION OF THE DRAWINGS

FIG. 1 is a top view of a first preferred embodiment of a bungee cord having hookless ends in accordance with the present invention.

FIG. 2 is a side view of a first preferred embodiment of a bungee cord having hookless ends in accordance with the present invention.

FIG. 3. is a side view of a spade end being inserted into a lock slot in accordance with the present invention.

FIG. 3a is a bottom view of a spade end being inserted into a lock slot in accordance with the present invention.

FIG. 4 is a side view of a spade end locked in a lock slot in accordance with the present invention.

FIG. 4a is a bottom view of a spade end locked in a lock slot in accordance with the present invention.

FIG. 9 is a top view of a third preferred embodiment of a bungee cord having hookless ends in accordance with the present invention.

FIG. 10 is a side view of a third preferred embodiment of a bungee cord having hookless ends in accordance with the present invention.

FIG. 12 is a top view of a fourth preferred embodiment of a bungee cord having hookless ends in accordance with the present invention.

DETAILED DESCRIPTION OF THE PREFERRED EMBODIMENTS

Figure 5:
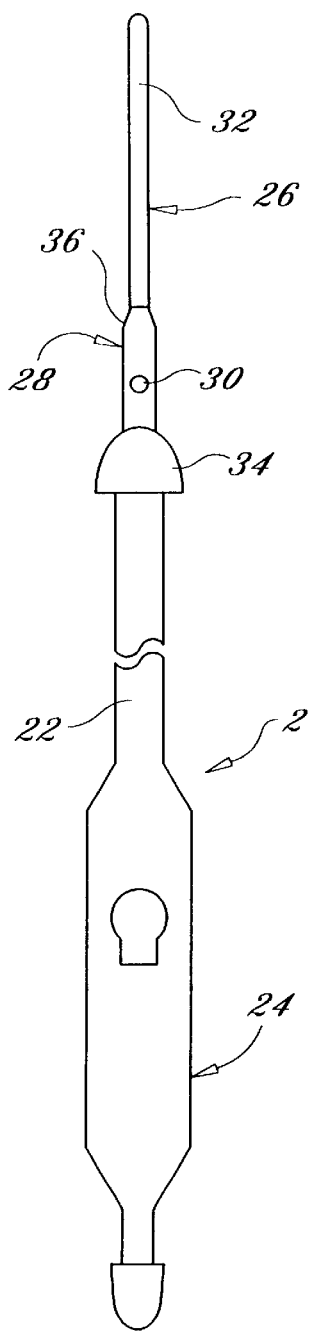
FIG. 5 is a top view of a second preferred embodiment of a bungee cord having hookless ends in accordance with the present invention.
Figure 6:
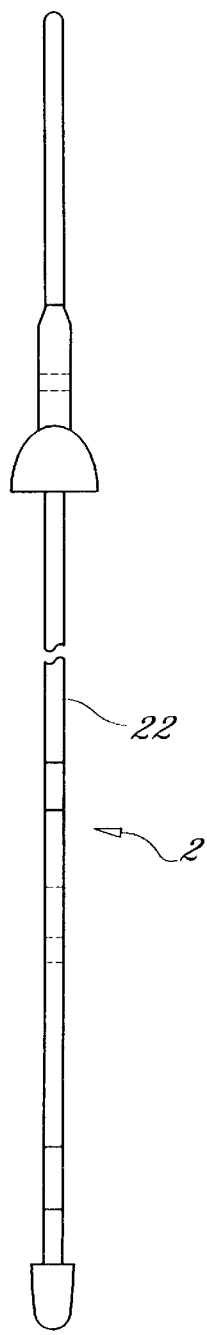
FIG. 6 is a side view of a second preferred embodiment of a bungee cord having hookless ends in accordance with the present invention.
Figure 7:
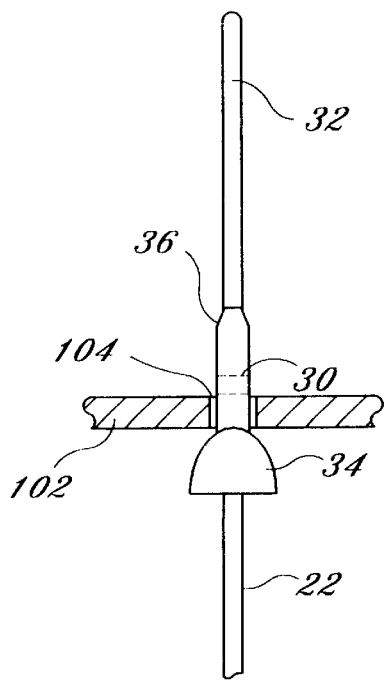
FIG. 7 is a side view of a tongue extension inserted through a hole in an item in accordance with the present invention.
Figure 8:
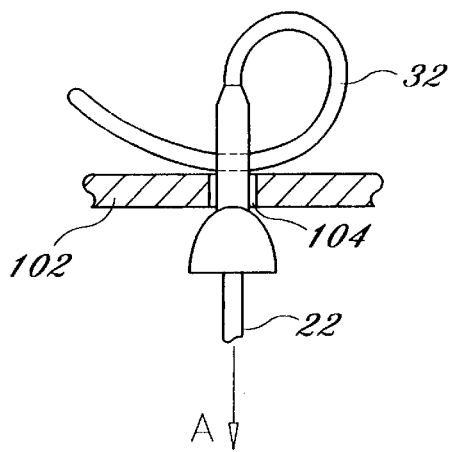
FIG. 8 is a side view of a tongue extension inserted through a tongue hole and restraining the second preferred embodiment of a bungee cord with hookless ends from being withdrawn the hole in the item in accordance with the present invention.

With reference now to the drawings, and particularly to FIG. 1, there is shown a top view of a first preferred embodiment of a bungee cord with hookless ends 1. With reference to FIGS. 2–4a, the bungee cord with hookless ends 1 includes an elastic body 10, a first spade attachment end 12, and a second spade attachment end 14. Each spade attachment end includes a lock body 16, a spade end 18 and a lock slot 20. The lock slot 20 has the shape of a circle terminated by a rectangle. However, the shape of the lock slot 20 should not be limited to that shown in FIG. 1, but could be a rectangle, or any other suitable shape. The lock slot 20 could be reinforced by embedding a metal slug into the lock body 16 with the lock slot 20 formed through the metal slug.

The elastic body 10 and the lock bodies 16 are preferably fabricated from a single piece of elastic material such as rubber or multi-strand elastic. The elastic body 10 could also be fabricated from any other suitable elastic material which is presently known or not yet invented. Alternatively, the lock body 16 could be made of nylon webbing that is molded into or bonded to an end of the elastic body 10. The elastic body 10 could also be covered with a braided nylon cover. The spades 18 are preferably rubber over molded on the ends of the elastic bodies 16. The spades 18 could also be plastic over molded on the ends of the elastic bodies 16. The spades 18 could be formed by bonding or embedding rubber, plastic or any other substance to the ends of the elastic bodies 16. The lock bodies 16 are preferably wider at a center than at the ends thereof. The increased width will compensate for stretching of the lock bodies 16 during usage.

In use, each spade end 18 is wrapped around an item 100. The spade end 18 is twisted for insertion into the lock slot 20. The length of the lock slot 20 allows the length of the spade end 18 to be inserted therethrough. The spade end 18 is then twisted back to its original orientation to lock thereof in the lock slot 20. The lock body 16 is pulled back to insure that the spade end 18 is locked in the lock slot 20.

With reference to FIGS. 5–8, a second preferred embodiment of the bungee cord with hookless ends 2 includes an elastic body 22, a spade attachment end 24, and a tongue attachment end 26. The spade attachment end 24 is fabricated and used the same way as previously described. The tongue attachment end 26 includes a tongue body 28, a tongue hole 30, and a tongue extension 32. The tongue body 28 includes a spade contoured portion 34 and a straight portion 36. The tongue hole 30 is disposed in the straight portion 28 of the tongue body. The tongue hole 30 may be reinforced with a metal sleeve or the like. The tongue attachment end 26, the elastic body 22, and the spade attachment end 24 are preferably fabricated from a single piece of elastic material such as rubber or multi-strand elastic. The elastic body 22 could also be fabricated from any other suitable elastic material which is presently known or not yet invented.

In use, the tongue attachment end 26 is locked to an item 102 having a hole 104. To lock the tongue attachment end 26 to the item 102, the tongue extension 32 is inserted through the hole 104 in the item 102 until the spade contoured portion 34 prevents further insertion. The tongue extension 32 is then inserted through the tongue hole 30. Pressure "A" exerted by the elastic body 22 in extension forces the tongue extension 32 against the item 102 and prevents the tongue extension 30 from withdrawing from the tongue hole 30.

Figure 11:
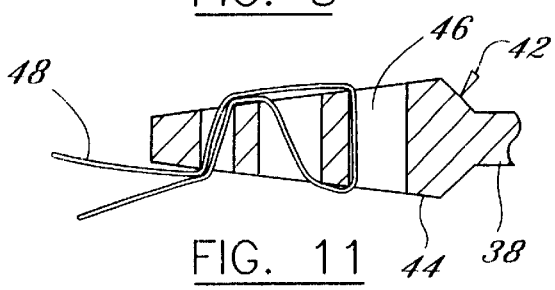
FIG. 11 is an enlarged cross-sectional view of a strap retained in a strap attachment end in accordance with the present invention.

With reference to FIGS. 9–11, a third preferred embodiment of the bungee cord with hookless ends 3 includes an elastic body 38, a tongue attachment end 40, and a strap attachment end 42. The tongue attachment end 40 is fabricated and used the same way as previously described. The strap attachment end 42 includes a strap body 44 with at least two slots 46 for retention of a strap 48. The strap body 44 is preferably tapered as shown to compensate for stretching during usage. The strap attachment end 42 could be fabricated from the same material as the elastic body 38 or could be a separate piece which is molded into or bonded to the elastic body 38. In use, the strap 48 may be attached to the bungee cord with hookless ends 3 by inserting thereof through the slots 46 in the strap body 44. The bungee cord with hookless ends 3 may be used for retaining tarpaulins over boats and the like. The strap attachment ends 42 of two bungee cords with hookless ends 3 are attached to each end of a strap. The tongue attachment ends 40 are inserted through the grommets in the tarpaulins and the strap adjusted until the tarpaulin is securely retained.

With reference to FIG. 12, a fourth preferred embodiment of the bungee cord with hookless ends 4 includes an elastic body 50, a spade attachment end 40, and a strap attachment end 42.

The elastic bodies, lock bodies, and attachment ends of all embodiments may all or singularly have a florescent color.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A bungee cord with hookless ends comprising:

an elastic body having two ends;

a strap body terminating a first end of said elastic body, at least two slots being formed through said strap body to receive a strap; and a spade end being formed on a second end of said elastic body; and at least one lock slot being disposed near said second end, each said lock slot being sized to receive a single said spade end, wherein said spade end being insertable into said lock slot for preventing said spade end from being withdrawn from said lock slot.

2. The bungee cord with hookless ends of claim 1, wherein:

said spade end being twisted for insertion into said lock slot, said spade end being untwisted after insertion for preventing said spade end from being withdrawn from said lock slot.

3. The bungee cord with hookless ends of claim 1, wherein:

said elastic body having a greater width adjacent said lock slot.

4. The bungee cord with hookless ends of claim 1, wherein:

said spade end being fabricated of over molded material.

5. The bungee cord with hookless ends of claim 1, wherein:

said spade end being fabricated by bonding a material thereto.

6. The bungee cord with hookless ends of claim 1, wherein:

said elastic body having a florescent color.

7. A bungee cord with hookless ends comprising:

an elastic body having two ends;

a strap body terminating a first end of said elastic body, at least two slots being formed through said strap body to receive a strap; and a spade end being formed on a second end of said elastic body; and at least one lock slot being disposed near said second end, each said lock slot being sized to receive a single said spade end, wherein said spade end being twisted for insertion into said lock slot, said spade end being untwisted after insertion for preventing said spade end from being withdrawn from said lock slot.

8. The bungee cord with hookless ends of claim 7, wherein:

said elastic body having a greater width adjacent said lock slot.

9. The bungee cord with hookless ends of claim 7, wherein:

said spade end being fabricated of over molded material.

10. The bungee cord with hookless ends of claim 7, wherein:

said spade end being fabricated by bonding a material thereto.

11. The bungee cord with hookless ends of claim 7, wherein:

said elastic body having a florescent color.

* * * * *